(12) United States Patent
Liebig

(10) Patent No.: US 6,598,399 B2
(45) Date of Patent: Jul. 29, 2003

(54) INTEGRATED POWER PLANT AND METHOD OF OPERATING SUCH AN INTEGRATED POWER PLANT

(75) Inventor: Erhard Liebig, Laufenberg (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/729,274

(22) Filed: Dec. 5, 2000

(65) Prior Publication Data
US 2001/0008066 A1 Jul. 19, 2001

(30) Foreign Application Priority Data
Jan. 19, 2000 (DE) .......................... 100 01 997

(51) Int. Cl.$^7$ ................................ F02C 6/18
(52) U.S. Cl. ..................... 60/772; 60/39.12; 60/39.182; 122/7 B
(58) Field of Search .............. 60/39.02, 39.12, 60/39.182, 772; 122/7 R, 7 B

(56) References Cited

U.S. PATENT DOCUMENTS

| | | | | |
|---|---|---|---|---|
| 4,136,643 A | * | 1/1979 | Aguet | 122/7 B |
| 4,468,923 A | * | 9/1984 | Jorzyk et al. | 60/39.182 |
| 4,478,039 A | * | 10/1984 | Horgan | 60/39.12 |
| 4,896,498 A | * | 1/1990 | Knizia | 60/39.182 |
| 4,907,406 A | | 3/1990 | Kirikami et al. | |
| 5,233,934 A | * | 8/1993 | Krigmont et al. | 60/39.182 |
| 5,247,907 A | * | 9/1993 | Lee et al. | 122/7 R |
| 5,367,870 A | * | 11/1994 | Vollmer | 60/39.182 |
| 5,442,908 A | * | 8/1995 | Briesch et al. | 60/39.182 |
| 5,673,634 A | * | 10/1997 | Karger et al. | 60/39.182 |
| 5,775,266 A | * | 7/1998 | Ziegler | 122/7 R |
| 5,887,418 A | * | 3/1999 | Bruckner et al. | 60/39.182 |

FOREIGN PATENT DOCUMENTS

| | | |
|---|---|---|
| DE | 1526896 | 6/1970 |
| DE | 3 731 082 | 4/1989 |
| DE | 4019343 C2 | 12/1991 |
| DE | 4116065 A1 | 11/1992 |
| DE | 4304124 C1 | 3/1994 |
| EP | 0591163 B1 | 1/1995 |
| EP | 0822320 A1 | 2/1998 |
| GB | 2 082 084 | 3/1982 |

OTHER PUBLICATIONS

"Das Verbundkraftwerk—eine neue Variante des kombinierten Kraftwerkes", Bauer, et al., VGB Kraftwerkstechnik 73 (1993), pp. 84,120–121.

* cited by examiner

Primary Examiner—Ted Kim
(74) Attorney, Agent, or Firm—Burns, Doane, Swecker & Mathis, L.L.P.

(57) ABSTRACT

An integrated power plant comprises a gas-turbine set with a compressor, a combustion chamber and a gas turbine, a heat-recover boiler arranged downstream of the gas turbine, and a water/steam circuit with a steam turbine, a condenser, a feedwater tank and a separately fired steam generator having a flue-gas NOx-reduction unit arranged on the flue-gas side downstream of the steam generator, the heat-recovery boiler for the generation of steam being incorporated in the water/steam circuit. In such a power plant, in order to improve the part-load behavior, a branch line is provided at the heat-recovery boiler, by means of which branch line a predetermined portion of the exhaust gases coming from the gas-turbine set and flowing through the heat-recovery boiler can be branched off and added upstream of the flue-gas NOx-reduction unit to the flue gases coming from the steam generator.

20 Claims, 2 Drawing Sheets

INTEGRATED POWER PLANT AND METHOD OF OPERATING SUCH AN INTEGRATED POWER PLANT

This application claims priority under 35 U.S.C. §§119 and/or 365 to Appln. No. 100 01 997.8 filed in Germany on Jan. 19, 2000; the entire content of which is hereby incorporated by reference.

FIELD OF THE INVENTION

The present invention relates to the field of power plant technology. It concerns an integrated power plant and a method of operating such an integrated power plant.

BACKGROUND OF THE INVENTION

The present invention relates to the field of power plant technology. It concerns an integrated power plant according to the preamble of claim 1 and a method of operating such an integrated power plant.

An integrated power plant of the type referred to has been disclosed by the article by G. Bauer et al.

SUMMARY OF THE INVENTION

"Das Verbund-Kraftwerk—eine neue Variante des kombinierten Kraftwerks" [The integrated power plant—a new variant of the combined-cycle power plant], VGB Kraftwerkstechnik 73, No. 2, pp. 120–121 (1993).

A conventional coal-fired power plant (for example a hard-coal-fired power plant) essentially comprises a coal-fired steam generator, a condensing turbine and a condensate/feedwater heater. Such an exemplary coal-fired power plant forms the right-hand part of the integrated power plant 10 shown in FIG. 1 and consists of those plant parts which are designated by the reference numerals 21 to 50 (with the exception of reference numeral 43). The thermal circuit diagram shows a water/steam circuit 49 with simple reheating (reheater 22), a three-cylinder steam turbine 26 with a high-pressure stage 27, an intermediate-pressure stage 28 and a low-pressure stage 29, and regenerative heating with a condensate heater 37 and a feedwater heater 31.

The preheated feedwater passes into the steam generator 21. The live steam generated is delivered to the high-pressure stage 27, is then reheated, and is then expanded in the stages 28 and 29. The steam turbine 26 drives a generator 30. A condenser 42 is arranged downstream of the low-pressure stage 29 of the steam turbine 26. The resulting condensate is pumped by a condensate pump 41 through the condensate heater 37 into a feedwater tank/deaerator 33. From there, a feedwater pump 32 pumps the feedwater through the feedwater heater 31 into the steam generator 21.

The coal-fired steam generator 21 receives crushed coal via a mill 24 and fresh air, which is necessary for the combustion, via a forced-draft fan 36. The resulting flue gas is cleaned after flowing through the steam generator 21 and delivered to the environment via a stack. A hot flue-gas NOx-reduction unit (high-dust DeNOx) 23 is provided as the first exhaust-gas cleaning stage. Further cooling of the flue gases is effected in an air heater 25. Provided downstream of it is an electrostatic precipitator 34. The induced-draft fan 35 then delivers the flue gases to a flue-gas desulfurization unit 39. A regenerative flue-gas heater 38 may also be arranged in between.

It is essential with regard to the invention that the flue-gas temperature of such a conventional steam generator or boiler depends on the load to a very high degree, and that, at the same time, the flue-gas NOx-reduction units, frequently used nowadays, in a high-dust circuit require a certain temperature range of about 320° C. (280° C.) to 400° C. for the flue gas.

Another known type of power plant is the so-called combined-cycle power plant in which a gas-turbine set and a conventional coal-fired power plant are interconnected on the flue-gas side. In this case, the advantages of a combination of the gas-turbine cycle and the Rankine cycle are utilized by utilizing the waste heat and the residual-oxygen content of the gas-turbine exhaust gas. The gas turbine in this case is used, as it were, as a forced-draft fan for the conventionally fired steam generator. During normal operation, the gas turbine exhaust gas serves the coal firing as an oxygen carrier. If the gas turbine is shut down or has failed, the steam generator and steam turbine can continue to be operated by a back-up forced-draft fan and an adequately dimensioned steam and flue-gas air heater. Such a combined-cycle power plant is described or shown, for example, in EP-B1-0 591 163 or VGB Kraftwerkstechnik 71, No. 2, page 84 (1991).

However, on account of the type of coupling, the flue-gas-side interconnection of the gas-turbine set and the conventional coal-fired power plant in the case of the combined-cycle power plant has disadvantages, which have then led to the concept of the integrated power plant, in which the coupling between gas-turbine set with heat-recovery boiler and coal-fired power plant is restricted to the water/steam circuit. Various possibilities of this coupling between heat-recovery boiler and water/steam circuit are disclosed in the publication mentioned at the beginning.

If selective catalytic reduction (SCR), which is preferred nowadays, according to the high-dust method is now used in such an integrated power plant for the flue-gas NOx reduction of the coal-fired steam generator, care must be taken to ensure that the temperatures remain within the abovementioned temperature range of the catalyst (approx. 280° C. or 320° C. to 400° C.) even at part load. To this end, the following additional measures have been disclosed hitherto:

the economizer (for heating the feedwater) arranged upstream of the catalyst contains a bypass, so that less heat is extracted from the flue gas when required by opening the bypass;

a bypass is provided for the flue gas, via which bypass the economizer is bypassed when required and the heat extraction from the flue gas can thus be reduced;

a start-up part-load heat exchanger, which relieves the load on the economizer, is used for the feedwater heating.

These are measures which are exclusively intended to keep the flue-gas temperature (at part load) upstream of the catalyst at a high level by relieving (reducing) the flue-gas-side heat absorption in the economizer.

In principle, the load on the economizer of the steam generator may be relieved by proportional heating and evaporation of feedwater in the heat-recovery boiler in those circuit variants of the integrated power plants with (at least proportional) live-steam generation. This helps to improve a part-load behavior of the conventional steam generator with regard to the flue-gas NOx-reduction unit. However, these measures must be regarded as being restricted in their potential. There is in any case no such improvement in other circuit variants.

The object of the invention is therefore to provide an integrated power plant having a flue-gas NOx-reduction unit according to the "high-dust" method, which power plant has an improved part-load behavior with regard to the flue-gas NOx reduction irrespective of the respective coupling between heat-recovery boiler and water/steam circuit, and to specify a method of operating it.

The essence of the invention is to keep the flue-gas temperature upstream of the flue-gas NOx-reduction unit within the predetermined temperature range by specifically feeding some of the gas-turbine exhaust gas to the stream generator even at part load of the same.

The object is achieved by all the features of claims 1 and 9 together. The essence of the invention is to keep the flue-gas temperature upstream of the flue-gas NOx-reduction unit within the predetermined temperature range by specifically feeding some of the gas-turbine exhaust gas to the steam generator even at part load of the same.

A first development of the invention is characterized in that means for setting or controlling the branched-off portion of the exhaust gases coming from the gas-turbine set are provided, and in that the setting or control means comprise a damper arranged in the branch line and a damper arranged in the exhaust-gas duct leading from the heat-recovery boiler to a stack. As a result, it is possible in a simple manner, for various part-load cases, to in each case optimally set the proportion of the added gas-turbine exhaust gases with regard to the catalyst.

A second development of the invention is distinguished by the fact that the heat-recovery boiler contains a heating-surface system for generating and/or superheating steam for the water/steam circuit, and that the branch line branches off from the heat-recovery boiler downstream of the heating-surface system in the exhaust-gas-side direction of flow. Due to this heating-surface system, the exhaust gases of the gas turbine are cooled down (to 350° C. to 400° C.) to such an extent that they can be fed without further treatment directly to the steam generator. The heat-recovery boiler preferably contains a further heating-surface system for the condensate heating for the water/steam circuit, and the branch line branches off from the heat-recovery boiler upstream of the further heating-surface system.

A third development of the invention is characterized in that a heating surface, in particular in the form of an economizer or a sectional economizer, is arranged upstream of the flue-gas NOx-reduction unit in the flue-gas-side direction of flow, and in that the branched-off portion of the exhaust gases coming from the gas-turbine set is added upstream of this heating surface to the flue gases coming from the steam generator.

A fourth development of the invention is characterized in that the branched-off portion of the exhaust gases coming from the gas-turbine set is added directly upstream of the flue-gas NOx-reduction unit to the flue gases coming from the steam generator.

A fifth development of the invention is characterized in that the heat-recovery boiler for the generation of steam and/or for the superheating of steam is incorporated in the water/steam circuit.

A preferred development of the method according to the invention is distinguished by the fact that the flue gas is delivered from the steam generator to a stack by means of an induced-draft fan arranged downstream of the steam generator, and that the induced-draft fan is operated in such a way that the exhaust-gas-side pressures in the heat-recovery boiler do not change. This ensures that the output of the gas turbine is not reduced by increased pressure losses.

A further preferred development of the method according to the invention is distinguished by the fact that the flue gas is delivered from the steam generator to a stack by means of an induced-draft fan arranged downstream of the steam generator, and that the induced-draft fan is operated in such a way that the exhaust-gas-side pressures in the heat-recovery boiler are reduced and the output of the gas turbine is increased as a result.

Further embodiments follow from the dependent claims.

The invention is independent of actual parameters, functional principles, types of construction, designs and the like of steam generators and heat-recovery boilers.

BRIEF DESCRIPTION OF THE DRAWINGS

Preferred embodiments of the invention are disclosed in the following description and illustrated in the accompanying drawings.

The invention is to be explained in more detail with reference to exemplary embodiments in connection with the drawing, in which.

DETAILED DESCRIPTION OF THE INVENTION

Figure 1:
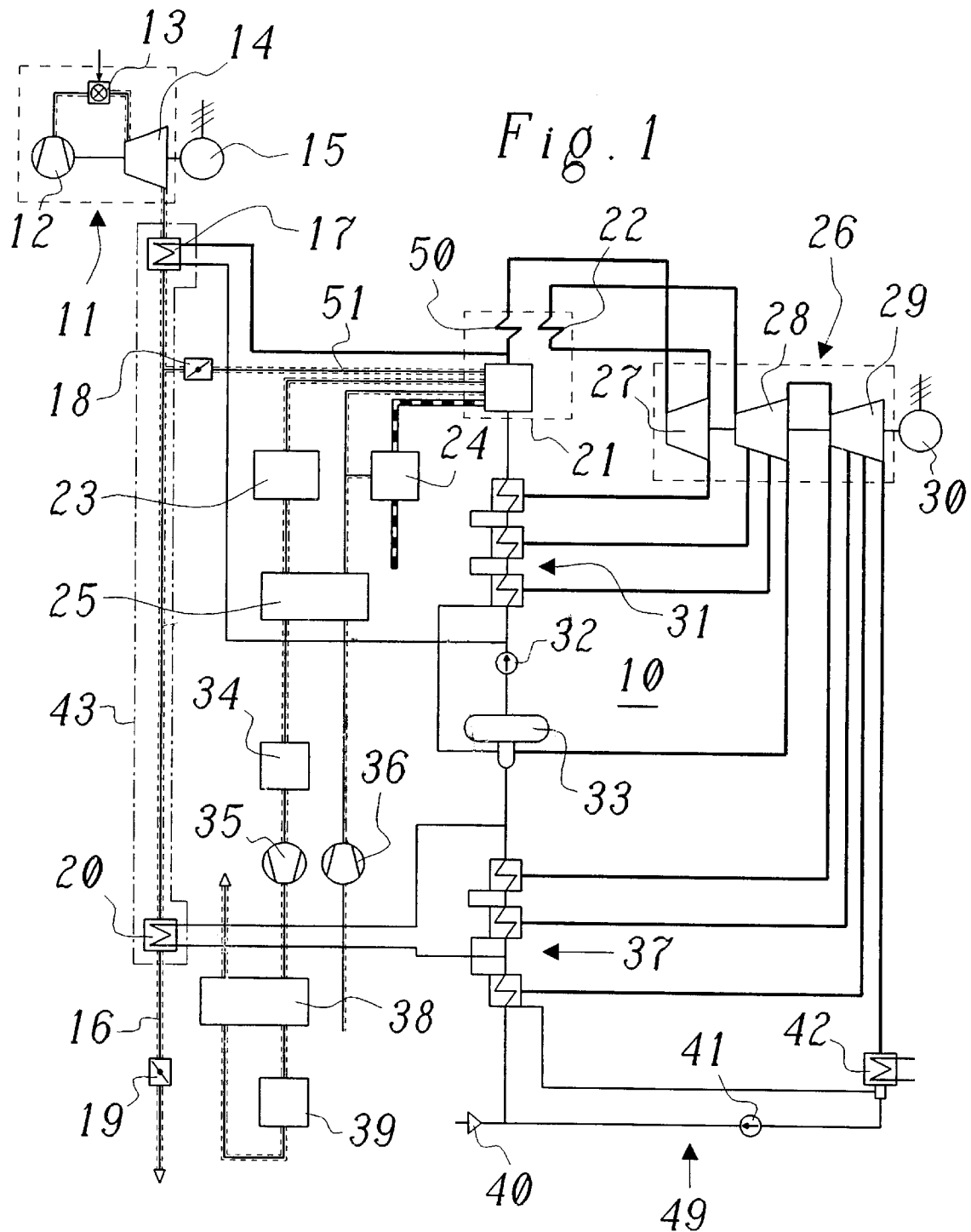
FIG. 1 shows a simplified circuit diagram of an integrated power plant in a preferred exemplary embodiment of the invention.

A simplified circuit diagram of an integrated power plant in a preferred exemplary embodiment of the invention is shown in FIG. 1. The integrated power plant 10 is composed of a conventional coal-fired power-plant section, having a coal-fired steam generator 21 arranged in a water/steam circuit 49, and of a gas-turbine set 11 with downstream heat-recovery boiler 43. As already described at the beginning, this water/steam circuit 49 has simple reheating (reheater 22), a three-cylinder steam turbine 26 with a high-pressure stage 27, an intermediate-pressure stage 28 and a low-pressure stage 29, and regenerative heating consisting of a condensate heater 37 and a feedwater heater 31.

The heated feedwater passes into the steam generator 21. The live steam generated is delivered to the high-pressure stage 27, is then reheated, and is then expanded in the stages 28 and 29. The steam turbine 26 drives a generator 30. A condenser 42 is arranged downstream of the low-pressure stage 29 of the steam turbine 26. The resulting condensate is pumped by a condensate pump 41 through the condensate heater 37 into a feedwater tank/deaerator 33. From there, a feedwater pump 32 pumps the feedwater through the feedwater heater 31 into the steam generator 21. Make-up water 40 may be added downstream of the condensate pump 41.

The coal-fired steam generator 21 receives crushed coal via a mill 24 and fresh air, which is necessary for the combustion, via a forced-draft fan 36. The resulting flue gas is cleaned after flowing through the steam generator 21 and delivered to the environment via a stack. A hot flue-gas NOx-reduction unit (high-dust DeNOx) 23 is provided as the first exhaust-gas cleaning stage. Further cooling of the flue gases is effected in an air heater 25. Provided downstream of it is an electrostatic precipitator 34. The induced-draft fan 35 then delivers the flue gases to a flue-gas desulfurization unit 39. A regenerative flue-gas heater 38 may also be arranged in between.

The gas-turbine set 11 comprises a compressor 12, a combustion chamber 13 and a gas turbine 14. The compressor 12 and gas turbine 14 are arranged on a rotor, which is connected to a generator 15 for the generation of electricity. The exhaust gases from the gas turbine 14 flow through the heat-recovery boiler 43, which contains two heating-surface systems 17 and 20 connected one behind the other, and leave the heat-recovery boiler 43 in an exhaust-gas duct 16 leading to a stack. The heating-surface system 17 generates steam for the steam turbine 26. It receives feedwater from the water/steam circuit 49, this feedwater being extracted downstream of the feedwater pump 32, and feeds the generated steam into the circuit again upstream of the superheater 51. The heating-surface system 20 extracts condensate downstream of the first stage of the three-stage condensate heater 37 and feeds in the heated condensate between condensate heater 37 and feedwater tank/deaerator 33.

Figure 2:
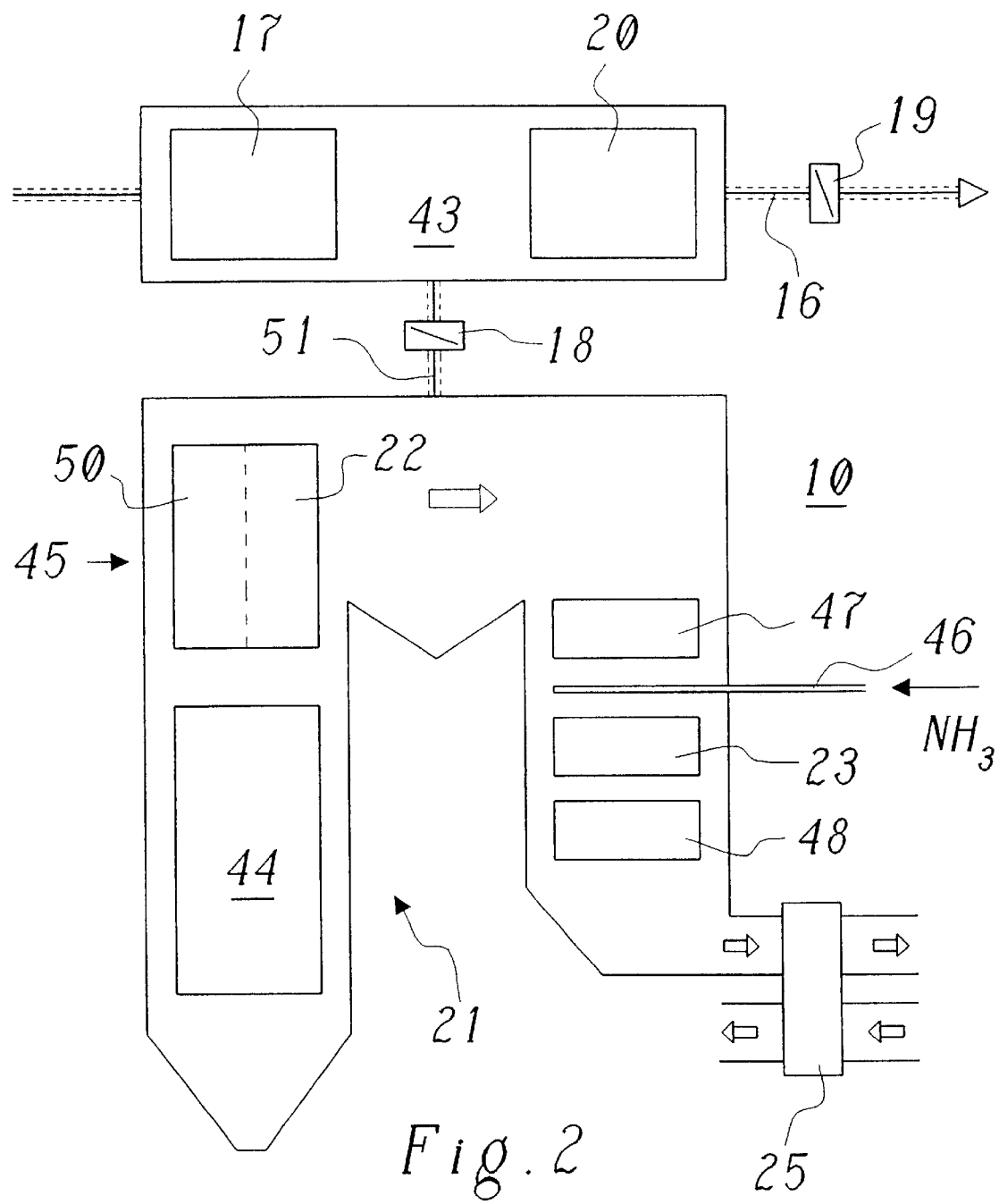
FIG. 2 shows, in detail, a possible (flue-gas-side) interconnection between heat-recovery boiler and steam generator in an integrated power plant according to FIG. 1.

The internal construction of the steam generator 21 is reproduced by way of example in FIG. 2. The hot flue gases of the steam generator 21 flow through an evaporator 44 and a superheater/reheater 45 and then pass through a first economizer or sectional economizer 47, the flue-gas NOx-reduction unit 23 and a second economizer or sectional economizer 48 before they finally flow through the air heater 25 to the electrostatic precipitator 34 (FIG. 1). Before reaching the flue-gas NOx-reduction unit 23, ammonia (NH$_3$) is sprayed into the flue gas via an ammonia supply 46.

Unlike the conventional integrated plant, in the integrated power plant in FIG. 1 there is not only the feedwater-side or steam-side coupling, already described, between gas-turbine set 11 and conventional coal-fired block, there is now also a flue-gas-side coupling. A branch line 51 starts from the heat-recovery boiler 43 between the two heating-surface systems 17 and 20 and branches off the exhaust gas coming from the gas turbine 14 and directs it to the steam generator 21. The proportion of the exhaust gas which is branched off from the exhaust gas flowing through the exhaust-gas duct 16 can be set and controlled by means of two dampers 18, 19 or comparable shut-off elements, which are arranged in the branch line 51 and the exhaust-gas duct 16, respectively. If, for example at part load of the steam generator 21, the damper 19 is increasingly closed and the damper 18 is increasingly opened, the proportion of the branched off exhaust gas increases, and vice versa. In this case, the heating-surface system 17 cools the exhaust gas discharging from the gas turbine 14 only to such an extent (for example to 350° C. to 400° C.) that it is suitable, after admixing in the steam generator 21, to keep the flue gas there within the temperature range required for the catalytic NOx reduction.

The location at which the exhaust gas branched off from the heat-recovery boiler 43 is introduced into the steam generator 21 depends in practice on the heating-surface arrangement there and can be seen by way of example from the representation in FIG. 2. In this case, the branch line 51 opens into the steam generator 21 between the superheater/reheater 45 and the first (sectional) economizer 47. The (entire) economizer is in this case divided into two (sectional) economizers 47, 48 which are arranged upstream of and downstream of the flue-gas NOx-reduction unit 23. However, it is also conceivable for the (entire) economizer to be arranged solely upstream of the flue-gas NOx-reduction unit 23 and to thus occupy the place of the first economizer 47. Finally, it is also conceivable for the exhaust gas fed via the branch line 51 to come directly into contact with the flue-gas NOx-reduction unit 23. In this case, the economizer may be arranged on the flue-gas side upstream of or downstream of the flue-gas NOx-reduction unit 23.

The additional exhaust-gas-side interconnection according to the invention of gas-turbine set and coal-fired block has in particular the following advantages:

The outlay for this interconnection is low compared with the combined-cycle plant.

The exhaust gas of the gas turbine is clean.

The flexibility or the modes of operation of the integrated power plant are markedly increased.

The advantages of the integrated power plant per se are retained up to extreme part loads of the conventional steam generator.

In this case, the following has to be taken into account: in order not to influence the output of the gas turbine due to the changeover mechanism with regard to the exhaust gas of the gas turbine, the induced-draft fan 35 (FIG. 1) for the flue-gas take-off is to be designed and operated in such a way that the flue-gas-side pressures do not change.

Depending on the actual interconnection of heat-recovery boiler 43 and water/steam circuit 49 and on the design and configuration of the heat-recovery boiler 43, it is possible to design and operate the induced-draft fan 35 for the flue-gas take-off in such a way that the exhaust-gas-side pressures in the heat-recovery boiler 43 are reduced and the output of the gas turbine 14 is increased as a result. In the event of a vacuum, the damper 19 ought to be closed in order to avoid back-suction from the stack.

| LIST OF DESIGNATIONS | |
|---|---|
| 10 | Integrated power plant |
| 11 | Gas-turbine set |
| 12 | Compressor |
| 13 | Combustion chamber |
| 14 | Gas turbine |
| 15, 30 | Generator |
| 16 | Exhaust-gas duct |
| 17, 20 | Heating-surface system |
| 18, 19 | Damper |
| 21 | Steam generator |
| 22 | Reheater |
| 23 | Flue-gas NOx-reduction unit |
| 24 | Mill |
| 25 | Air heater |
| 26 | Steam turbine |
| 27 | High-pressure stage |
| 28 | Intermediate-pressure stage |
| 29 | Low-pressure stage |
| 31 | Feedwater heater |
| 32 | Feedwater pump |
| 33 | Feedwater tank/deaerator |
| 34 | Electrostatic precipitator |
| 35 | Induced-draft fan |
| 36 | Forced-draft fan |
| 37 | Condensate heater |
| 38 | Regenerative flue-gas heater |
| 39 | Flue-gas desulfurization unit |
| 40 | Make-up water |
| 41 | Condensate pump |
| 42 | Condenser |
| 43 | Heat-recovery boiler |
| 44 | Evaporator |
| 45 | Superheater/reheater |
| 46 | Ammonia supply |
| 47, 48 | Economizer |
| 49 | Water/steam circuit |
| 50 | Superheater |
| 51 | Branch line |

What is claimed is:

1. An integrated power plant, comprising a gas-turbine set with a compressor, a combustion chamber and a gas turbine, hot exhaust gases of said gas turbine flowing through a heat-recovery boiler arranged downstream of said gas turbine to exit the power plant after having passed said heat recovery boiler, and a water/steam circuit with a steam generator which is fired separately by burning a carbon-containing fuel with fresh combustion air not being part of said hot exhaust gases of said gas turbine, said steam generator having a flue-gas NOx-reduction unit arranged downstream of the steam generator, the heat-recovery boiler being incorporated in the water/steam circuit, wherein a branch line is provided at the heat-recovery boiler, by means of which branch line a predetermined portion of the exhaust gases coming from the gas-turbine set and flowing through the heat-recovery boiler is branched off and is added upstream of the flue-gas NOx-reduction unit to the flue gases flowing through the steam generator.

2. The integrated power plant as claimed in claim 1, wherein means for setting or controlling the branched-off portion of the exhaust gases coming from the gas-turbine set are provided.

3. The integrated power plant as claimed in claim 2, wherein the setting or control means comprise a damper arranged in the branch line and a damper arranged in the exhaust-gas duct leading from the heat-recovery boiler to a stack.

4. The integrated power plant as claimed in claim 1, wherein the heat-recovery boiler contains a heating-surface system for generating and/or superheating steam for the water/steam circuit, and in that the branch line branches off from the heat-recovery boiler downstream of the heating-surface system in the exhaust-gas-side direction of flow.

5. The integrated power plant as claimed in claim 4, wherein the heat-recovery boiler contains a heating-surface system for the condensate heating for the water/steam circuit, and in that the branch line branches off from the heat-recovery boiler upstream of the heating-surface system in the exhaust-gas-side direction of flow.

6. The integrated power plant as claimed in claim 1, wherein a heating surface is arranged upstream of the flue-gas NOx-reduction unit in the flue-gas-side direction of flow, and in that the branched-off portion of the exhaust gases coming from the gas-turbine set is added upstream of this heating surface to the flue gases coming from the steam generator.

7. The integrated power plant as claimed in claim 1, wherein the branched-off portion of the exhaust gases coming from the gas-turbine set is added directly upstream of the flue-gas NOx-reduction unit to the flue gases coming from the steam generator.

8. The integrated power plant as claimed in claim 1, wherein the heat-recovery boiler for the generation of steam and/or for the superheating of steam is incorporated in the water/steam circuit.

9. A method of operating an integrated power plant as claimed in claim 1, wherein a predetermined portion of the exhaust gases coming from the gas-turbine set and flowing through the heat-recovery boiler is branched off and is added upstream of the flue-gas NOx-reduction unit to the flue gases coming from the steam generator.

10. The method as claimed in claim 9, wherein the exhaust gases coming from the gas-turbine set and flowing through the heat-recovery boiler are cooled to a temperature of between 350° C. and 400° C. before the predetermined portion of the exhaust gases is branched off.

11. A method of operating an integrated power plant, comprising the steps of: providing an integrated power plant, the integrated power plant including a gas-turbine set with a compressor, a combustion chamber and a gas turbine, a heat-recovery boiler arranged downstream of the gas turbine, and a water/steam circuit with a steam generator fired separately from said gas turbine with respect to a combustion air used having a flue-gas NOx-reduction unit arranged downstream of the steam generator, the heat-recovery boiler being incorporated in the water/steam circuit, wherein a branch line is provided at the heat-recovery boiler, by means of which branch line a predetermined portion of the exhaust gases coming from the gas-turbine set and flowing through the heat-recovery boiler is branched off and is added upstream of the flue-gas NOx-reduction unit to the flue gases flowing through the steam generator, a predetermined portion of the exhaust gases coming from the gas-turbine set and flowing through the heat-recovery boiler is branched off and is added upstream of the flue-gas NOx-reduction unit to the flue gases coming from the steam generator, wherein the flue gas is delivered from the steam generator to a stack by means of an induced-draft fan arranged downstream of the steam generator, and in that the induced-draft fan is operated in such a way that the exhaust-gas-side pressures in the heat-recovery boiler do not change.

12. A method of operating an integrated power plant, comprising the steps of: providing an integrated power plant, the integrated power plant including a gas-turbine set with a compressor, a combustion chamber and a gas turbine, a heat-recovery boiler arranged downstream of the gas turbine, and a water/steam circuit with a steam generator fired separately from said gas turbine with respect to a combustion air used having a flue-gas NOx-reduction unit arranged downstream of the steam generator, the heat-recovery boiler being incorporated in the water/steam circuit, wherein a branch line is provided at the heat-recovery boiler, by means of which branch line a predetermined portion of the exhaust gases coming from the gas-turbine set and flowing through the heat-recovery boiler is branched off and is added upstream of the flue-gas NOx-reduction unit to the flue gases flowing through the steam generator, a predetermined portion of the exhaust gases coming from the gas-turbine set and flowing through the heat-recovery boiler is branched off and is added upstream of the flue-gas NOx-reduction unit to the flue gases coming from the steam generator, wherein the flue gas is delivered from the steam generator to a stack by means of an induced-draft fan arranged downstream of the steam generator, and in that the induced-draft fan is operated in such a way that the exhaust-gas-side pressures in the heat-recovery boiler are reduced and the output of the gas turbine is increased as a result.

13. An integrated power plant, comprising:
    a gas turbine set with a compressor, a combustion chamber, and gas turbine, hot exhaust gases of said gas turbine flowing through a heat-recovery boiler arranged downstream of said gas turbine to exit the power plant after having passed said heat recovery boiler;
    a water/steam circuit with a steam generator which is fueled separately by burning coal with fresh combustion air not being part of said hot exhaust gases of said gas turbine said steam generator having a flue-gas NOx-reduction unit arranged downstream of the steam generator, the heat-recovery boiler being incorporated in the water/steam circuit;
    wherein a branch line is provided at the heat-recovery boiler, by means of which branch line a predetermined portion of the exhaust gases coming from the gas turbine arrangement and flowing through the heat-recovery boiler is branched off and added upstream of the flue-gas NOx-reduction unit to the flue gases flowing through the steam generator.

14. The integrated power plant as claimed in claim 13, further comprising means for setting or controlling the predetermined portion of exhaust gases coming from the gas-turbine arrangement.

15. The integrated power plant as claimed in claim 14, wherein said setting or control means comprise a damper arranged in the branch line and a damper arranged in the exhaust-gas duct leading from the heat-recovery boiler to a stack.

16. The integrated power plant as claimed in claim 13, wherein a heating surface is arranged upstream of the flue-gas NOx-reduction unit in the flue-gas-side direction of flow, and in that the branched-off portion of the exhaust gases coming from the gas-turbine set is added upstream of this heating surface to the flue gases coming from the steam generator.

17. The integrated power plant as claimed in claim 13, wherein the branched-off portion of the exhaust gases coming from the gas-turbine set is added directly upstream of the flue-gas NOx-reduction unit to the flue gases coming from the steam generator.

18. An integrated power plant, comprising:
- a gas turbine arrangement including a compressor, a combustion chamber, and gas turbine, hot exhaust gases of said gas turbine flowing through a heat-recovery boiler arranged downstream of said gas turbine to exit the power plant after having passed said heat recovery boiler;
- a water/steam circuit with a steam generator which is fired separately by burning coal with fresh combustion air not being part of said hot exhaust gases of said gas turbine, said steam generator having a flue-gas NOx-reduction unit arranged downstream of the steam generator, the heat-recovery boiler being incorporated in the water/steam circuit;
- a branch line for branching off a predetermined portion of the exhaust gases coming from the gas turbine arrangement and flowing through the heat-recovery boiler, the exhaust gases being added upstream of the flue-gas NOx-reduction unit to the flue gases flowing through the steam generator,
- wherein the heat-recovery boiler contains a heating-surface system for generating and/or superheating steam for the water/steam circuit, and in that the branch line branches off from the heat-recovery boiler downstream of the heating-surface system in the exhaust-gas-side direction of flow.

19. An integrated power plant, comprising:
- a gas turbine arrangement including a compressor, a combustion chamber, and gas turbine, hot exhaust gases of said gas turbine flowing through a heat-recovery boiler arranged downstream of said gas turbine to exit the power plant after having passed said heat recovery boiler;
- a water/steam circuit with a steam generator which is fired separately by burning coal with fresh combustion air not being part of said hot exhaust gases of said gas turbine, said steam generator having a flue-gas NOx-reduction unit arranged downstream of the steam generator, the heat-recovery boiler being incorporated in the water/steam circuit;
- a branch line for branching off a predetermined portion of the exhaust gases coming from the gas turbine arrangement and flowing through the heat-recovery boiler, the exhaust gases being added upstream of the flue-gas NOx-reduction unit to the flue gases flowing through the steam generator,
- wherein the heat-recovery boiler contains a heating-surface system for the condensate heating for the water/steam circuit, and in that the branch line branches off from the heat-recovery boiler upstream of the heating-surface system in the exhaust-gas-side direction of flow.

20. A method of operating an integrated power plant, comprising the steps of:
- providing an integrated power plant including a gas-turbine arrangement, said gas turbine arrangement including a compressor, a combustion chamber, and a gas turbine;
- flowing hot exhaust gases through a heat-recovery boiler downstream of the gas turbine to exit the power plant after having passed said heat recovery boiler;
- arranging a water/steam circuit with a steam generator fired separately by burning a carbon-containing fuel with fresh combustion air not being part of said hot exhaust gases of the gas turbine, said steam generator having a flue-gas NOx-reduction unit downstream of the steam generator; and
- branching off at the heat-recovery boiler a predetermined portion of the exhaust gases coming from the gas turbine arrangement and flowing through the heat-recovery boiler and adding it to upstream of the flue-gas NOx-reduction unit to the flue gases coming from the steam generator.

* * * * *